A. WASHBURN.

PAPER FOLDING MACHINE.

No. 5,516. Reissued July 29, 1873.

Witnesses:

A. Bennemendorf.

Alex F. Roberts

Inventor:

A. Washburn

PER

Attorneys.

THE NORRIS PETERS CO., PHOTO-LITHO., WASHINGTON, D. C.

UNITED STATES PATENT OFFICE

ALVAH WASHBURN, OF MEDINA, OHIO.

IMPROVEMENT IN PAPER-FOLDING MACHINES.

Specification forming part of Letters Patent No. 133,393, dated November 26, 1872; reissue No. 5,516, dated July 29, 1873; application filed May 1, 1873.

*To all whom it may concern:*

Be it known that I, ALVAH WASHBURN, of Medina, in the county of Medina and State of Ohio, have invented a new and Improved Paper-Folding Machine, of which the following is a specification:

This invention relates to an improved machine for folding paper, which is designed to be arranged in proper relation to a printing-press for performing with celerity and to perfection the entire operation of folding paper; and to this end my invention consists of a series of light folding-frames hinged on the top of a table and provided with operating-gear actuated by a cam-shaft, said frames being arranged in such order and sizes relatively to each other that a printed sheet delivered on the table over all the folding-frames by the depositors of a printing-press will be folded in the order of folding it by hand, and thrown off the machine by another frame similar to the folding-frames, the said machine being operated in a peculiar way by the printing-press, from which it receives the sheets as they are printed, as hereinafter described.

Figure 1:
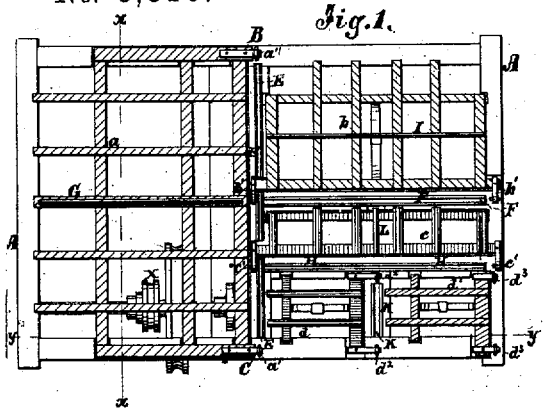
Figure 2:
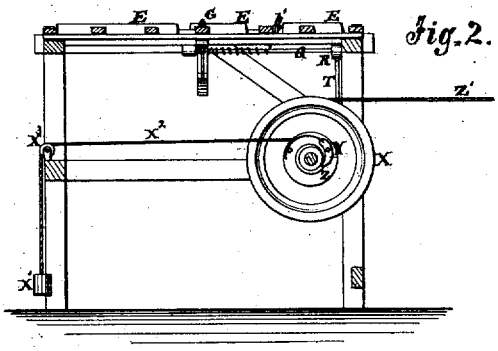
Figure 3:
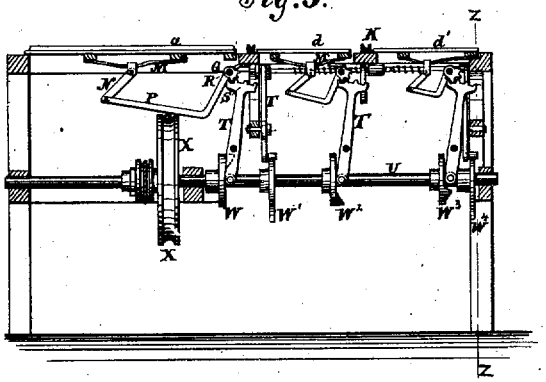
Figure 4:
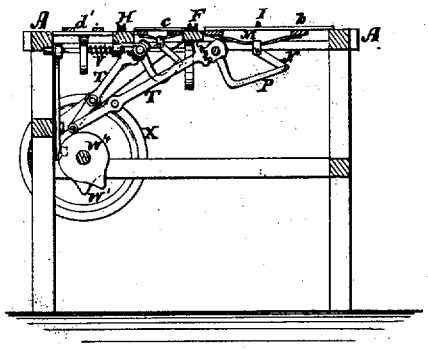
Figure 5:
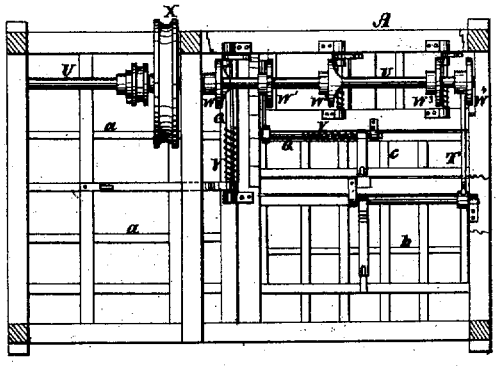
Figure 6:
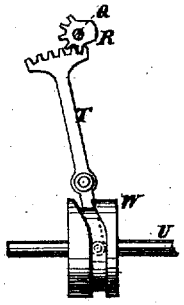

In the drawing, Figure 1 is a plan view of my improved folding-machine. Fig. 2 is a transverse section taken on the line *x x* of Fig. 1. Fig. 3 is a longitudinal sectional elevation of the said machine taken on the line *y y* of Fig. 1. Fig. 4 is a section on the line *z z*. Fig. 5 is a plan of the bottom of the machine, and Fig. 6 is a modification of some of the driving-gear.

Similar letters of reference indicate corresponding parts.

A represents the table or frame, which will be as large over the top as the paper sheet to be folded, and suitably arranged relatively to the bed of a printing-press to have the sheets delivered upon it by the depositors of the printing-press as they are discharged from the bed. Said table will preferably stand in such relation to the printing-press that the sheets will be delivered either from the side B or C. This table supports a series of folding-frames, *a b c d*, and a discharging-frame, $d^1$, which cover the whole area of the top, or nearly so. The frame *a*, which is equal to half the area of all the frames, is hinged to the table at *a'*, and swings over onto all the other frames. The frame *b*, which is equal to one-fourth of the area, is hinged to the table at *b'* at right angles to the axis of *a*, and swings over onto the frames *c*, *d*, and $d^1$. The frame *c*, which is equal to one-eighth of the area of the table, is hinged to said table at *c'*, also at right angles to frame *a*, and swings over onto frames *d* and $d^1$. The frame *d*, which is equal to one-sixteenth of the area of the table, is hinged to said table at $d^2$, and swings over onto frame $d^1$, which is of the same size as frame *d*, and is pivoted to the table at $d^3$, and swings over the edge of the table to the right, throwing the folded paper off onto the floor or into any suitable receptacle. E represents a long narrow strip or rib of metal traversing the table in the axis of the frame *a*, with a groove in its upper face, in which it is designed that a creasing-rib on the depositor of the printing press shall come when it lays the sheet on the table, and press it into the groove, so as to crease it for the first fold. F is a similar grooved rib in the axis of the folding-frame *b*, into which a creasing-rib, G, on folding-frame *a*, is intended to come for creasing the paper for the second fold. H is another grooved rib in the axis of frame C, and I a creaser on frame *b* for creasing the third fold. K is the grooved rib in the axis of frame *d*, and L a creaser on frame *c* for creasing the paper for the fourth fold. These frames are connected on the under side by a spring, M, and a link, N, with an arm, P, of a rock-shaft, Q, which is worked by a pinion, R, which is turned by a vibrating lever, T, with a toothed segmental end, S, gearing with said pinion, and operated in the direction for folding the paper by a cam on the driving-shaft U, and they are returned by a spring, V, on the rock-shaft. The springs M will enable the folding-frames to conform to the interposed paper, as said springs possess the required degree of elasticity for this purpose. The cams for working the folding-frames are marked W, $W^1$, $W^2$, $W^3$, and $W^4$, respectively, and they are so adjusted on the cam-shaft as to work the frames in successive order, beginning with *a*, as quickly as may be, and so that the whole operation is completed and all the frames are returned ready for receiving another sheet before the completion of a double movement of the table, by which I propose to actuate the said shaft; and for so operating it I have a loose pulley, X, arranged on it with a spring-pawl, Y, to engage the shaft at a notch, Z, when the pulley turns forward, on which pulley I have a cord, Z′, which is connected to the bed of the printing-press to turn said pulley forward when the bed moves from the folding-machine, at which time it is required that the folding shall be done. This wheel X will be of such size as is necessary to cause the cam-shaft to turn far enough during the forward movement of the bed of the printing-press to actuate all the folders; but it is preferred that the cam-shaft make one complete revolution. A weight, $X^1$, cord $X^2$, and pulley $X^3$ are used, in the manner shown, for returning the wheel and winding up the cord Z′ as the bed of the printing-press comes forward.

Having thus fully described my invention, what I desire to secure by reissue of Letters Patent is—

1. The arms P, shaft Q, and springs M V, in combination with each other and with the folding-frames, substantially as and for the purpose specified.

2. In combination with the driving or cam shaft U, the loose wheel X, pawl Y, catch Z, and rope Z′, combined with the bed of a printing-press, as and for the purpose described.

3. The combination of the weighted cord $X^2$, loose wheel X, pawl Y, cam-shaft U, lever T, rack and pinions R S, catch Z, and rope Z′, combined with each other, substantially as described, to operate in connection with the bed of a printing-press, as set forth.

In testimony that I claim the above I have hereunto set my hand this 14th day of April, A. D. 1873.

ALVAH WASHBURN.

Witnesses:
FERDINAND CUTTER,
JNO. N. MAIN.